United States Patent
Noh et al.

(10) Patent No.: US 8,363,302 B2
(45) Date of Patent: Jan. 29, 2013

(54) ELECTROCHROMIC DEVICE AND METHOD OF MANUFACTURING THE SAME

(75) Inventors: Chang Ho Noh, Suwon-si (KR); Seog Jin Jeon, Yongin-si (KR); Rupasree Ragini Das, Suwon-si (KR); Seon-Jeong Lim, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 115 days.

(21) Appl. No.: 13/064,578

(22) Filed: Apr. 1, 2011

(65) Prior Publication Data

US 2012/0147447 A1  Jun. 14, 2012

(30) Foreign Application Priority Data

Dec. 9, 2010 (KR) .................. 10-2010-0125492

(51) Int. Cl.
G02F 1/153 (2006.01)
G02F 1/15 (2006.01)
(52) U.S. Cl. ..................... 359/273; 359/265
(58) Field of Classification Search .............. 359/265, 359/267, 273, 275, 296
See application file for complete search history.

(56) References Cited

U.S. PATENT DOCUMENTS

| | | | |
|---|---|---|---|
| 4,993,810 A | 2/1991 | Demiryont | |
| 6,067,184 A | 5/2000 | Bonhote et al. | |
| 7,785,496 B1 | 8/2010 | Shim et al. | |
| 8,059,330 B2 * | 11/2011 | Takagi et al. | 359/296 |
| 2009/0097096 A1 | 4/2009 | Noh et al. | |
| 2010/0132988 A1 | 6/2010 | Valentin et al. | |

FOREIGN PATENT DOCUMENTS

| | | |
|---|---|---|
| JP | 2000 -506629 | 5/2000 |
| JP | 2009-186731 | 8/2009 |
| JP | 2009-198974 | 9/2009 |
| JP | 2009-288409 | 12/2009 |
| KR | 102006002011 | 3/2006 |
| KR | 102009003706 | 4/2009 |
| KR | 102009007585 | 7/2009 |
| WO | WO/97-35227 | 9/1997 |
| WO | WO 02/075441 A2 | 9/2002 |
| WO | WO/2008-053109 | 5/2008 |

OTHER PUBLICATIONS

Stuart L. James, "Metal-organic frameworks", *Chem. Soc. Rev.*, vol. 32, pp. 276-288 (2003).
European Search Report dated May 3, 2012 in corresponding European Application No. 11187575.

* cited by examiner

*Primary Examiner* — David N Spector
(74) *Attorney, Agent, or Firm* — Harness, Dickey & Pierce, P.L.C.

(57) ABSTRACT

Disclosed is an electrochromic device that includes a first electrode and a second electrode facing each other, an electrochromic layer between the first electrode and the second electrode, and an electrolyte between the first electrode and the second electrode and being in contact with the electrochromic layer. The electrochromic layer may include a plurality of oxide semiconductor particles, a metal oxide on the surface of the oxide semiconductor particles, and an electrochromic material. An energy bandgap of the oxide semiconductor particles is in a range of about 3 eV to about 5 eV and an energy bandgap of the metal oxide is in a range of about 3 eV to about 5 eV, and a difference of conduction band energy levels of the oxide semiconductor particles and the metal oxide is about 0.5 eV or less. A method of manufacturing the electrochromic device may also be provided.

17 Claims, 11 Drawing Sheets

ELECTROCHROMIC DEVICE AND METHOD OF MANUFACTURING THE SAME

RELATED APPLICATIONS

This application claims priority under 35 USC §119 to Korean Patent Application No. 10-2010-0125492 filed in the Korean Intellectual Property Office (KIPO) on Dec. 9, 2010, the entire contents of which are incorporated herein by reference.

BACKGROUND

1. Field

The disclosure is related to an electrochromic device and a method of manufacturing the same.

2. Description of the Related Art

Electrochromism refers to a phenomenon in which a color reversibly changes by the direction of an electric field when a voltage is applied. A material having such property, that is, a material whose optical characteristic may reversibly change through an electrochemical redox reaction, is called an electrochromic material. An electrochromic material may not show color until an electric field is applied thereto, or conversely it may show color when no electric field is applied and when an electric field is applied, it loses the color.

An electrochromic material has been applied to an electrochromic device that changes light transmission characteristics depending on a voltage.

An electrochromic device is applied to a device using light transmission characteristics such as smart windows. Recently it has also been applied to a display device such as electronic paper due to excellent portability and light weight.

SUMMARY

Example embodiments are related to an electrochromic device and a method of manufacturing the same In example embodiments, an electrochromic device is provided that may be capable of lowering a process temperature, providing stable current characteristics, and having improved driving characteristics and reliability, when compared to the conventional art.

Another aspect of example embodiments provides a method of manufacturing the electrochromic device.

In accordance with example embodiments, an electrochromic device may include a first electrode and a second electrode facing each other, an electrochromic layer between the first electrode and the second electrode, and an electrolyte between the first electrode and the second electrode and contacting the electrochromic layer. In example embodiments the electrochromic layer may include a plurality of oxide semiconductor particles, a metal oxide on surfaces of the oxide semiconductor particles, and an electrochromic material. In example embodiments, energy bandgaps of the oxide semiconductor particles may be in a range of about 3 eV to about 5 eV and energy bandgaps of the metal oxide may be in a range of about 3 eV to about 5 eV, and a difference of conduction band energy levels of the oxide semiconductor particles and the metal oxide may be about 0.5 eV or less.

In example embodiments, a method of manufacturing an electrochromic device may include preparing a first electrode, preparing an electrophoresis solution including a metal salt having metal ions and oxide semiconductor particles, dipping the first electrode and a reference electrode into the electrophoresis solution and applying a voltage to provide oxide semiconductor particles of which the metal ions are bonded to one surface of the first electrode, heating the oxide semiconductor particles to form a metal oxide from the metal ions, forming an electrochromic material on surfaces of the oxide semiconductor particles, preparing a second electrode facing the first electrode, and filling an electrolyte between the first electrode and the second electrode. In example embodiments, the energy bandgap of the oxide semiconductor particles may be in a range of about 3 eV to about 5 eV and the energy bandgap of the metal oxide may be in a range of about 3 eV to about 5 eV, and a difference of conduction band energy levels of the oxide semiconductor particles and the metal oxide is about 0.5 eV or less.

According to one aspect of example embodiments, an electrochromic device is provided that includes a first electrode and a second electrode facing each other, an electrochromic layer positioned between the first electrode and the second electrode, and an electrolyte positioned between the first electrode and the second electrode and contacting the electrochromic layer. The electrochromic layer includes a plurality of oxide semiconductor particles, a metal oxide disposed on the surface of the oxide semiconductor particles, and an electrochromic material. Energy bandgaps of the oxide semiconductor particles may be in a range of about 3 eV to about 5 eV and an energy bandgap of the metal oxide may be in a range of about 3 eV to about 5 eV, and a difference of conduction band energy levels of the oxide semiconductor particles and the metal oxide is about 0.5 eV or less.

The energy bandgaps of the oxide semiconductor particles may be in a range of about 3 eV to about 4 eV and the energy bandgap of the metal oxide may be in a range of about 3 eV to about 4 eV.

The metal oxide may include zinc oxide.

The oxide semiconductor particles may include titanium oxide, zinc oxide, zirconium oxide, strontium oxide, niobium oxide, hafnium oxide, indium oxide, tin oxide, or a combination thereof.

The electrochromic material may be adsorbed on the surface of the oxide semiconductor particles.

The electrochromic device may further include a plurality of partitions to separate a space between the first electrode and the second electrode into a plurality of regions.

According to another aspect of example embodiments, a method of manufacturing an electrochromic device is provided that includes: preparing a first electrode; preparing electrophoresis solution including metal salts of metal ions and oxide semiconductor particles; dipping the first electrode and a reference electrode into the electrophoresis solution and applying a voltage to provide oxide semiconductor particles of which the metal ions are bonded to one surface of the first electrode; heating the oxide semiconductor particles to form a metal oxide from the metal ions; forming an electrochromic material on the surface of the oxide semiconductor particles; preparing a second electrode facing the first electrode; and filling an electrolyte between the first electrode and the second electrode, wherein energy bandgaps of the oxide semiconductor particles may be in a range of about 3 eV to about 5 ev and an energy bandgap of the metal oxide may be in a range of about 3 eV to about 5 eV, and wherein a difference of conduction band energy levels of the oxide semiconductor particles and the metal oxide is about 0.5 eV or less.

The energy bandgaps of the oxide semiconductor particles may be in a range of about 3 eV to about 4 eV and an energy bandgap of the metal oxide may be in a range of about 3 eV to about 4 eV.

The metal salts may include zinc salt, and the metal oxide may include zinc oxide.

The zinc salt may include zinc acetate, zinc carbonyl, zinc carbonate, zinc nitrate, zinc sulfate, zinc phosphate, zinc chloride, hydrates thereof, or a combination thereof.

The oxide semiconductor particles may include titanium oxide, zinc oxide, zirconium oxide, strontium oxide, niobium oxide, hafnium oxide, indium oxide, tin oxide, or a combination thereof.

The electrophoresis solution may include the dispersed oxide semiconductor particles in solvent including the metal salt.

The metal salt may be soluble in the solvent, and the oxide semiconductor particles may be insoluble in the solvent.

The heating of the oxide semiconductor particles may be performed at a temperature of about 450° C. or lower, and for example, it may be performed at a temperature of about 200° C. to about 350° C.

The manufacturing method may further include pressing and closely contacting the oxide semiconductor particles simultaneously with or before or after heating the oxide semiconductor particles.

The manufacturing method may further include providing a plurality of partitions that are separated from each other on one surface of the first electrode after preparing the first electrode.

BRIEF DESCRIPTION OF THE DRAWINGS

The patent or application file contains at least one drawing executed in color. Copies of this patent or patent application publication with color drawing will be provided by the Office upon request and payment of the necessary fee.

The above and other features and advantages will become more apparent by describing in detail example embodiments thereof with reference to the attached drawings.

DETAILED DESCRIPTION

Figure 1:
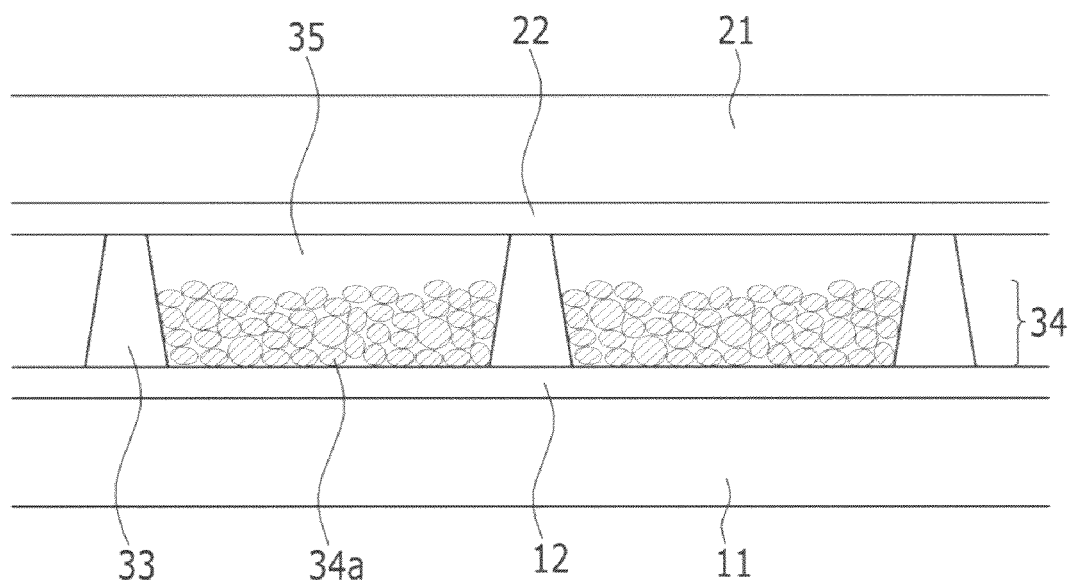
FIG. 1 is a schematic cross-sectional view of an electrochromic device according to example embodiments.

Various example embodiments will be described more fully hereinafter with reference to the accompanying drawings, in which some example embodiments are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments will be described more fully hereinafter with reference to the accompanying drawings. This disclosure may, however, be embodied in many different forms and should not be construed as limited to the example embodiments set forth herein.

First, an electrochromic device according to example embodiments is described with reference to drawings.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

FIG. 1 is a schematic cross-sectional view of an electrochromic device according to example embodiments.

Referring to FIG. 1, the electrochromic device according to example embodiments includes a lower substrate 11 and an upper substrate 21 facing each other, a lower electrode 12 disposed on one surface of lower substrate 11, an upper electrode 22 disposed on one surface of upper substrate 21, a plurality of partitions 33 disposed between the lower electrode 12 and the upper electrode 22 and separated from each other, an electrochromic layer 34 disposed in a plurality of regions separated by the plurality of partitions 33, and an electrolyte 35 filled between the lower electrode 12 and the upper electrode 22.

The lower substrate 11 and upper substrate 21 may be formed of insulating materials such as glass or plastic. Examples of the plastic include one or more selected from polyacrylate, polyethylene terephthalate, polyethylene naphthalate, polycarbonate, polyarylate, polyetherimide, polyethersulfone, and polyimide.

The lower electrode 12 may include a transparent conductor, for example an inorganic conductive material including indium tin oxide (ITO), fluorine tin oxide (FTO), or antimony-doped tin oxide (ATO), or an organic conductive material, e.g., polyacetylene or polythiophene.

The upper electrode 22 may be formed of a transparent or opaque conductive material, for example indium tin oxide (ITO) and fluorine tin oxide (FTO), a metal, for example, aluminum (Al), antimony-doped tin oxide (ATO), and/or a combination thereof.

The partitions 33 are disposed between the lower electrode 12 and the upper electrode 22. The partitions 33 define a plurality of regions between the lower electrode 12 and the upper electrode 22. The partitions 33 may be formed of photosensitive insulating materials, and each region separated by the partitions 33 may provide one sub-pixel.

The electrochromic layer 34 may be formed in each region separated by the partitions 33. The electrochromic layer 34 includes oxide semiconductor particles 34a, a metal oxide (not shown) disposed on the surface of the oxide semiconductor particles 34a, and an electrochromic material (not shown). The electrochromic material may be formed as a layer on the oxide semiconductor particles 23a and may be formed to cover surfaces of the oxide semiconductor particles 23a.

The oxide semiconductor particles 34a may include nano-sized semiconductor materials, for example titanium oxide ($TiO_2$), zinc oxide (ZnO), zirconium oxide (ZrO), strontium oxide (SrO), niobium oxide (NbO), hafnium oxide (HfO), tin oxide (SnO), or a combination thereof.

The oxide semiconductor particles 34a may be of various shapes including as a sphere, tetrahedron, cylinder, triangle, disk, tripod, tetrapod, cube, box, star, tube, and the like, and an average particle diameter thereof may be about 1 nm to about 200 nm.

The metal oxide is present on the surface of the oxide semiconductor particles 34a.

The metal oxide may be formed by oxidizing metal ion residue attached to the surface of the oxide semiconductor particles 34a when the oxide semiconductor layer for the electrochromic layer 34 is formed by electrophoresis.

The metal ions may act as an ion charger on the surface of the oxide semiconductor during the electrophoresis, so it may convert the oxide semiconductor particles 34a into an ionic state, and the oxide semiconductor particle 34a ions may become well-attached to the electrode surface.

In other words, insoluble oxide semiconductor particles 34a may be dispersed in a solvent including a metal salt that is soluble in the solvent to provide an electrophoresis solution, and a target electrode and a reference electrode may be dipped in the electrophoresis solution to bond the metal ions to the oxide semiconductor particles 34a when the voltage is applied. The oxide semiconductor particles 34a bounded with the metal ions may be transferred to the target electrode connected to the negative electrode with power and attached on the surface of the target electrode. Accordingly, the metal ions may provide an ionic character to the surface of the oxide semiconductor particles 34a, so letting the oxide semiconductor particles 34a be well-attached to the target electrode.

After completing the electrophoresis, the metal ion residue may remain on the surface of the oxide semiconductor particles 34a. The metal ion residue may be formed into the metal oxide by heat treatment.

The energy bandgaps of the oxide semiconductor particles 34a and metal oxide may range from about 3 eV to about 5 eV. For example, the energy bandgaps of the oxide semiconductor particles 34a and metal oxide may range from about 3 eV to about 4 eV.

A difference of conduction band energy levels of the oxide semiconductor particles and the metal oxide may be about 0.5 eV or less.

The energy bandgap means the electrical characteristic of a compound. When the metal oxide and the oxide semiconductor particles 34a have energy bandgaps within the ranges, each of them may have semiconductor characteristics. When the difference of conduction band energy levels of the metal oxide and the oxide semiconductor particles 34a is within the range, they may have similar electrical characteristics, so the electrical characteristic of the oxide semiconductor particles 34a may not be interfered with by the metal oxide.

If the oxide semiconductor particles 34a and the metal oxide have the energy bandgaps of less than about 3 eV, the visible ray light may be adsorbed so the display characteristics may be deteriorated; on the other hand, when it is more than about 5 eV, the insulating characteristic may be increased and the driving characteristics may be remarkably deteriorated.

In addition, if the ion charger is a compound ion of which the energy bandgap difference with the oxide semiconductor particles 34a is higher than the range, the electrical insulation is increased by the metal oxide, so it may interrupt the electric flow between the oxide semiconductor particles 34a and increase the electrical resistance at the interface between particles. Accordingly, the electrical characteristics of the electrochromic device may be deteriorated, and it may ultimately deteriorate chromatic characteristics.

The oxide semiconductor particles 34a may include, for example, titanium oxide ($TiO_2$), zinc oxide (ZnO), zirconium oxide (ZrO), strontium oxide (SrO), niobium oxide (NbO), hafnium oxide (HfO), tin oxide (SnO), or a combination thereof.

The metal oxide may include, for example, zinc oxide. The zinc oxide is a compound having an energy bandgap ranging from about 3.2 eV to about 3.4 eV which is a similar energy bandgap to that of the oxide semiconductor particles 34a, so it may reduce the effects on the electrical characteristics of the oxide semiconductor particles 34a to ensure the electrical characteristics and chromatic characteristic of the electrochromic device. Particularly, the characteristics may still be maintained as they were during low temperature baking at about 450° C. or lower, for example, about 200° C. to about 350° C., so the electrical resistance may be reduced at the interface between oxide particles and at the interface between the transparent electrode and the oxide particles. Thereby, the total display characteristics may be improved.

The electrical characteristics may also affect the temperature of heating the oxide semiconductor particles 34a. If the oxide semiconductor particles 34a are affected by the electrical characteristics due to the metal oxide, the temperature of heating the oxide semiconductor particles 34a may be further increased.

According to example embodiments, since the metal oxide having conduction band energy level that is not significantly different from that of the oxide semiconductor particles 34a may be formed on the surface of oxide semiconductor particles 34a, it may not affect the electrical characteristics and the chromatic characteristic even if the oxide semiconductor particles 34a are heated at a relatively low temperature of about 450° C. or lower, for example, about 200° C. to about 350° C.

The heating of the electrochromic device according to example embodiments may be carried out on the oxide semiconductor particles 34a at a relatively low temperature, so it may be applied to a flexible electrochromic device including a plastic substrate. Further, it may save the cost and time since the heating treatment temperature is not significantly increased.

The electrochromic material may be adsorbed on the surface of the oxide semiconductor particles 34a.

The electrochromic material is a compound that is capable of reversible color display by an electrochemical change according to an electric field direction when a voltage is applied, and it may display a unique color according to the material.

The electrochromic material may be cathodic coloration material that displays color in a reduction state and becomes transparent in an oxidation state, and the electrochromic material may be anodic coloration material that displays color in an oxidation state and becomes transparent in a reduction state.

The electrochromic material may include, for example, viologen compounds, phthalate-based compounds such as isophthalate, pyridine-based compounds, anthraquinone-based compounds, aminoquinone-based compounds, rare earth element-based organic compound phthalocyanine-based compounds, ruthenium-based organometallic compounds, leuco dye compounds, phenothiazine-based compounds, and the like.

The electrolyte 35 may be interposed between the lower electrode 12 and the upper electrode 22 and may contact the electrochromic layer 34.

The electrolyte 35 may provide material for promoting an oxidation/reduction reaction of the electrochromic material, and may be a liquid electrolyte or a solid polymer electrolyte. The liquid electrolyte may include, for example, solution wherein lithium salts, for example, LiOH or $LiClO_4$, a potassium salt, for example KOH, a sodium salt, for example, NaOH, is dissolved in a solvent. However, example embodiments are not limited thereto. The solid electrolyte may include, for example poly(2-acrylamino-2-methylpropane sulfonic acid) or poly(ethylene oxide). However, example embodiments are not limited thereto.

Hereinafter, the method of manufacturing the electrochromic device is described with reference to FIG. 2 to FIG. 5 together with FIG. 1.

FIG. 2 to FIG. 5 are cross-sectional views subsequently showing the method of manufacturing the electrochromic device shown in FIG. 1.

Figure 2:
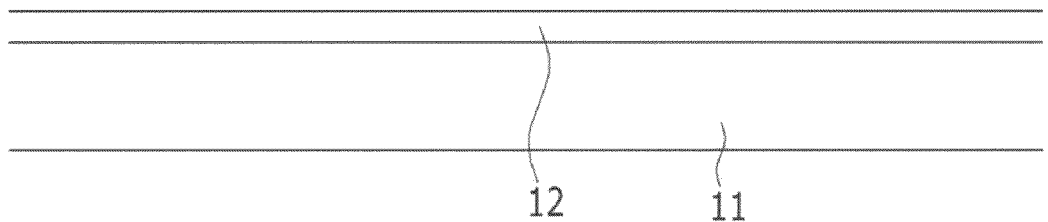
FIGS. 2 to 5 are cross-sectional views sequentially showing a method of manufacturing an electrochromic device of FIG. 1.

First a lower electrode 12 is formed on a lower substrate 11 as shown in FIG. 2. The lower electrode 12 may be formed by a method such as sputtering an inorganic conductive material such as indium tin oxide (ITO), fluorine-doped tin oxide (FTO), or antimony-doped tin oxide (ATO), or by a solution process such as spin-coating an organic conductive material such as polyacetylene or polythiophene.

Figure 3:
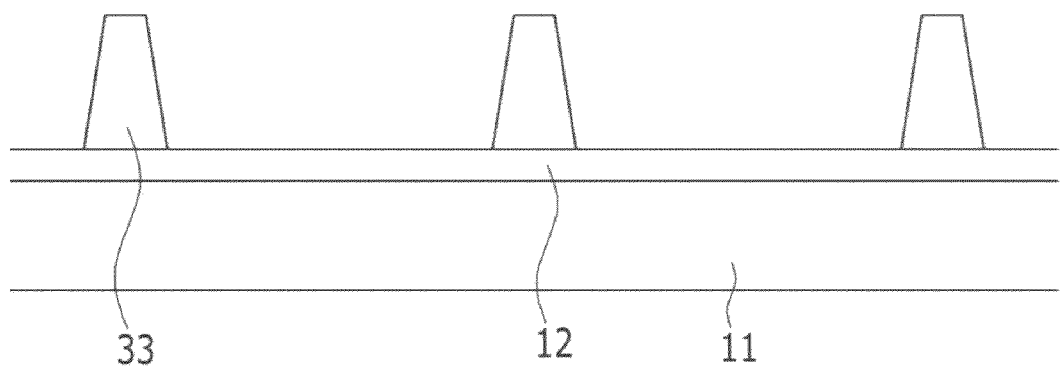

As shown in FIG. 3, a plurality of partitions 33 is formed on the lower electrode 12.

The partitions 33 may be formed by coating a photosensitive resin solution on the lower electrode 12 and patterning the same.

Figure 4:
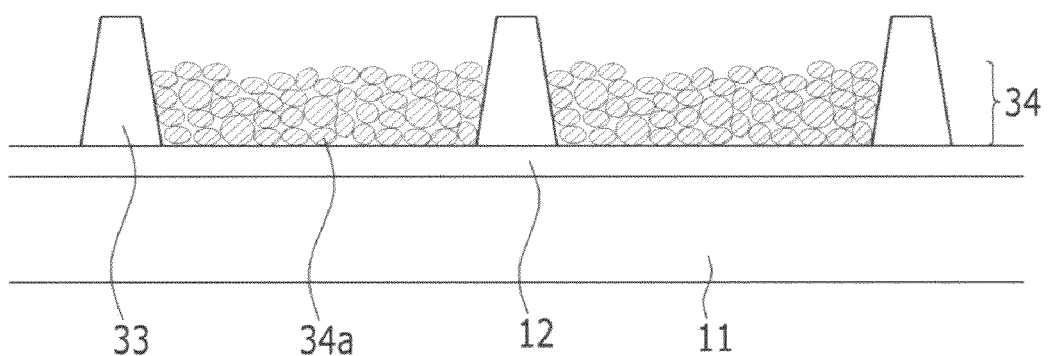

As shown in FIG. 4, the electrochromic layer 34 may be formed in each region separated by the partitions 33. The electrochromic layer 34 may include a plurality of oxide semiconductor particles 34a including a metal oxide on their surface, and an electrochromic material adsorbed on the surface of the oxide semiconductor particles 34a.

The electrochromic layer 34 may be formed by electrophoresis.

The electrophoresis may be performed as follows.

Figure 5:
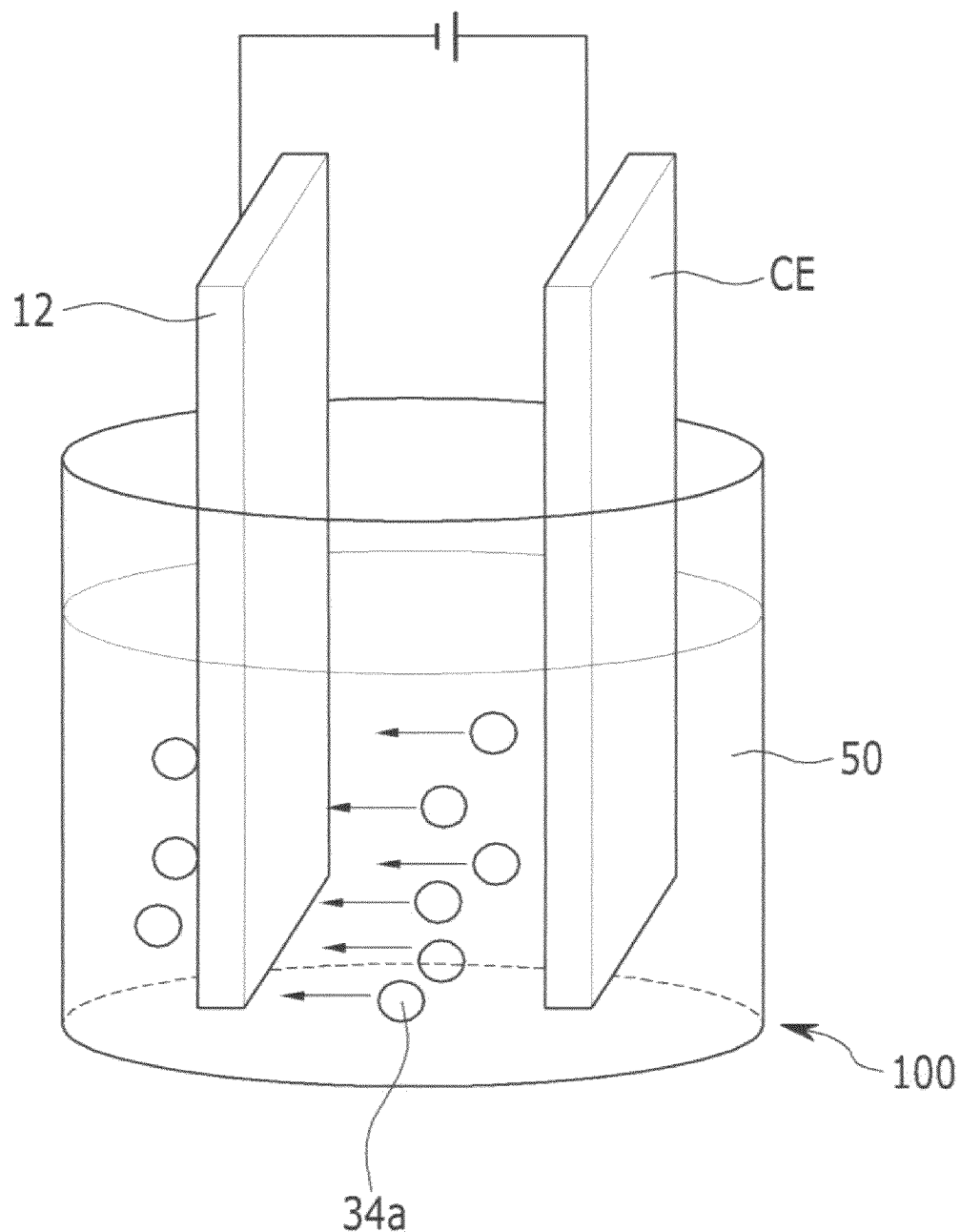

As shown in FIG. 5, an electrophoresis solution 50 may be prepared in a bath 100.

The electrophoresis solution 50 may be prepared by dispersing oxide semiconductor particles 34a in a solvent including a metal salt. The metal salt may be soluble in the solvent, but the oxide semiconductor particles 34a may be insoluble in the solvent.

The metal salt may include, for example, a zinc salt. The zinc salt may include, for example, zinc acetate, zinc carbonyl, zinc carbonate, zinc nitrate, zinc sulfate, zinc phosphate, zinc chloride, and hydrates thereof.

The solvent may include, for example, deionized water and/or an organic solvent.

The oxide semiconductor particles 34a may include, for example, titanium oxide, zinc oxide, zirconium oxide, strontium oxide, niobium oxide, hafnium oxide, indium oxide, tin oxide, or a combination thereof.

The lower substrate (11, for convenience, only the lower electrode 12 is shown in the drawing) including the lower electrode 12 and the partitions 33 and a reference electrode (CE) may be disposed in parallel in the bath 100 including the electrophoresis solution 50. In example embodiments, the lower electrode 12 may be disposed to face the reference electrode (CE).

The lower electrode 12 is connected to negative electrode power and the reference electrode (CE) is connected to positive electrode power, and voltage is applied thereto. When the external voltage is applied to the lower electrode 12 and the reference electrode (CE), metal ions are bonded to the surface of the oxide semiconductor particles 34a, and the oxide semiconductor particles 34a having positive charges on the surface of metal ions are transferred to the lower electrode 12 and attached to the surface of the lower electrode 12. The oxide semiconductor particles 34a are formed only in the region where the lower electrode 12 is exposed but are not formed in the region where the partitions 33 are provided.

In example embodiments, the lower substrate 11 may be removed from the bath 100 and washed and dried.

The oxide semiconductor particles 34a attached to the surface of the lower electrode 12 are then heated. They may be heated at a temperature of about 450° C. or lower, for example, about 200° C. to about 350° C.

The oxide semiconductor particles 34a may be pressed together and closely contact each other simultaneously with the step of heating the oxide semiconductor particles 34a or before or after heating the oxide semiconductor particles 34a. Accordingly, gaps between the plurality of oxide semiconductor particles 34a become denser by increasing the density of the oxide semiconductor particles 34a, so as to enhance the electrical mobility.

As shown in FIG. 1, the upper substrate 21 may be formed with the upper electrode 22 and the upper substrate 21 and the upper 22 may be combined with the lower substrate 11, and the lower electrode 12 such that the lower electrode 12 is disposed facing the upper electrode 22.

In example embodiments an electrolyte may be injected between the lower electrode 12 and the upper electrode 22.

The following examples illustrate this disclosure in more detail. However, it is understood that this disclosure is not limited by these examples.

MANUFACTURE OF ELECTROCHROMIC DEVICE

Example 1

Indium tin oxide (ITO) is stacked on a glass substrate at a thickness of about 150 nm to provide a transparent electrode (an example of a lower electrode), and the transparent electrode is coated with a negative type of photosensitive insulating film (SU-8, manufactured by Microchem) and patterned to provide a plurality of partitions. 1 g of titanium oxide ($TiO_2$) having an average particle diameter of about 15 nm is dispersed in isopropyl alcohol including about 0.4 g/l of $Zn(NO_3)_2 \cdot H_2O$ to prepare an electrophoresis solution.

A stainless steel member and the transparent electrode are disposed in the bath. The stainless steel member and the transparent electrode are separated by a distance of about 2 cm. In this example, the stainless steel member is used as an anode and the transparent electrode is used as a cathode. The electrophoresis solution is put into a bath and applied with a voltage of about 30V for about 3 minutes to perform electrophoresis. It is confirmed that a titanium oxide ($TiO_2$) layer is provided on the surface of the transparent electrode. The transparent electrode formed with titanium oxide ($TiO_2$) is washed with isopropyl alcohol and dried at about 90° C. Then the titanium oxide ($TiO_2$) layer is heated at about 350° C.

Subsequently, a solution including a viologen-based compound having a red electrochromic characteristic is prepared, and the transparent electrode formed with the titanium oxide ($TiO_2$) layer is immersed in the solution to provide an electrochromic monomolecule layer on the surface of the titanium oxide ($TiO_2$) layer.

Further, antimony-doped tin oxide (ATO) is stacked on another glass substrate to about 500 nm and fixed to a screen printing device, and a paste (Solaronix SAT nanoxide 300) including titanium oxide particles having an average particle diameter of about 300 nm is printed to provide a reflective layer. The screen printing sieve has a mesh size of about 86 μm. Then it is heated at a temperature of about 70° C. for about 20 minutes to remove an organic solvent and baked at a temperature of about 450° C. for about one hour under the air atmosphere to provide an opposed electrode (an example of an upper electrode).

A fine hole is then provided at the opposed electrode surface using a drill having a diameter of about 0.75 mm in order to inject an electrolyte, and the electrolyte is injected in the space between two electrodes through the hole to provide an electrochromic device. The electrolyte is gamma butyrolactone including 0.05M of $LiClO_4$ and 0.05M of ferrocene.

Example 2

An electrochromic device is fabricated in accordance with the same procedure as in Example 1, except that the titanium oxide ($TiO_2$) layer is heated at about 300° C.

Example 3

An electrochromic device is fabricated in accordance with the same procedure as in Example 1, except that the titanium oxide ($TiO_2$) layer is heated at about 250° C.

Example 4

An electrochromic device is fabricated in accordance with the same procedure as in Example 1, except that a viologen compound having a green electrochromic characteristic is used instead of the viologen compound having a red electrochromic characteristic.

Example 5

An electrochromic device is fabricated in accordance with the same procedure as in Example 1, except that a viologen compound having a blue electrochromic characteristic is used instead of the viologen compound having a red electrochromic characteristic.

Comparative Example 1

An electrochromic device is fabricated in accordance with the same procedure as in Example 1, except that the electrophoresis solution does not include $Zn(NO_3)_2 \cdot H_2O$.

Comparative Example 2

An electrochromic device is fabricated in accordance with the same procedure as in Example 1, except that the electrophoresis solution includes 0.4 g/l of $Mg(NO_3)_2 \cdot H_2O$ instead of 0.4 g/l of $Zn(NO_3)_2 \cdot H_2O$.

Comparative Example 3

An electrochromic device is fabricated in accordance with the same procedure as in Example 4, except that the electrophoresis solution includes 0.4 g/l of $Mg(NO_3)_2 \cdot H_2O$ instead of 0.4 g/l of $Zn(NO_3)_2 \cdot H_2O$.

Comparative Example 4

An electrochromic device is fabricated in accordance with the same procedure as in Example 5, except that the electrophoresis solution includes 0.4 g/l of $Mg(NO_3)_2 \cdot H_2O$ instead of 0.4 g/l of $Zn(NO_3)_2 \cdot H_2O$.

Evaluation 1

The electrochromic device obtained from Example 1 is evaluated through an atomic analysis of the titanium oxide layer.

Figure 6:
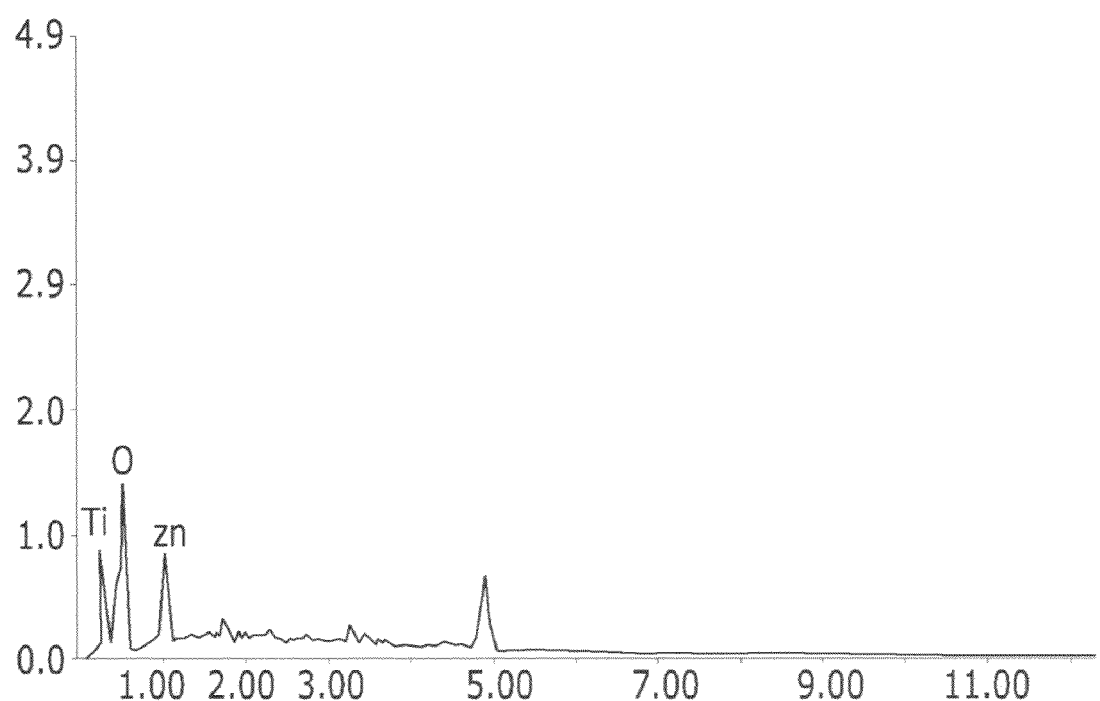
FIG. 6 is a graph showing an element analysis of a titanium oxide layer in an electrochromic device according to Example 1.

FIG. 6 is a graph showing the atomic analysis of the titanium oxide layer in the electrochromic device obtained from Example 1.

Referring to FIG. 6, it is confirmed that zinc atoms are detected in addition to titanium atoms and oxygen atoms in the titanium oxide layer.

Evaluation 2

The electrochromic devices obtained from Examples 1 and 5 and Comparative Examples 1, 2, and 4 are measured for electrical characteristics.

Figure 7:
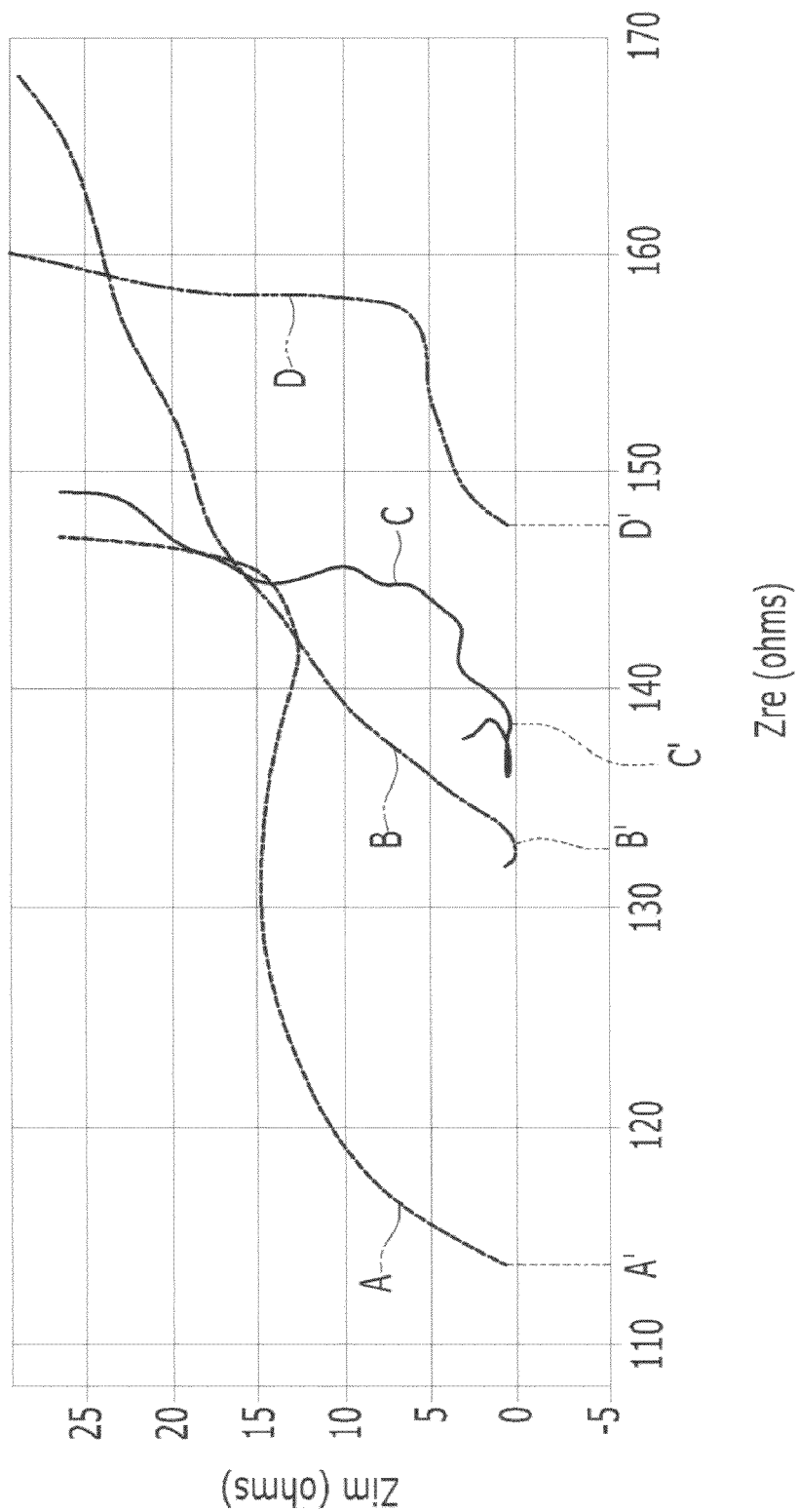
FIG. 7 is a graph showing electrical characteristics of electrochromic devices according to Examples 1 and 5 and Comparative Examples 2 and 4.

FIG. 7 is a graph showing electrical characteristics of electrochromic devices obtained from Examples 1 and 5 and Comparative Examples 1, 2, and 4.

Referring to FIG. 7, when the impedance of the red electrochromic device (A) obtained from Example 1 is compared to the impedance of the red electrochromic device (C) obtained from Comparative Example 2, the resistance (A') of the red electrochromic device (A) obtained from Example 1 is lower than the resistance (C') of the red electrochromic device (C) obtained from Comparative Example 2.

Similarly, when the impedance of the blue electrochromic device (B) obtained from Example 5 is compared to the impedance of the blue electrochromic device (D) obtained from Comparative Example 4, the resistance (B') of the blue electrochromic device (B) obtained from Example 5 is lower than the resistance (D') of the blue electrochromic device (D) obtained from Comparative Example 4.

On the other hand, since the electrochromic device obtained from Comparative Example 1 does not include the ion charger in the electrophoresis solution, the electrophoresis characteristic is not observed.

Evaluation 3

The color characteristics of the electrochromic devices obtained from Examples 1 to 3 are confirmed as follows.

Figure 8:
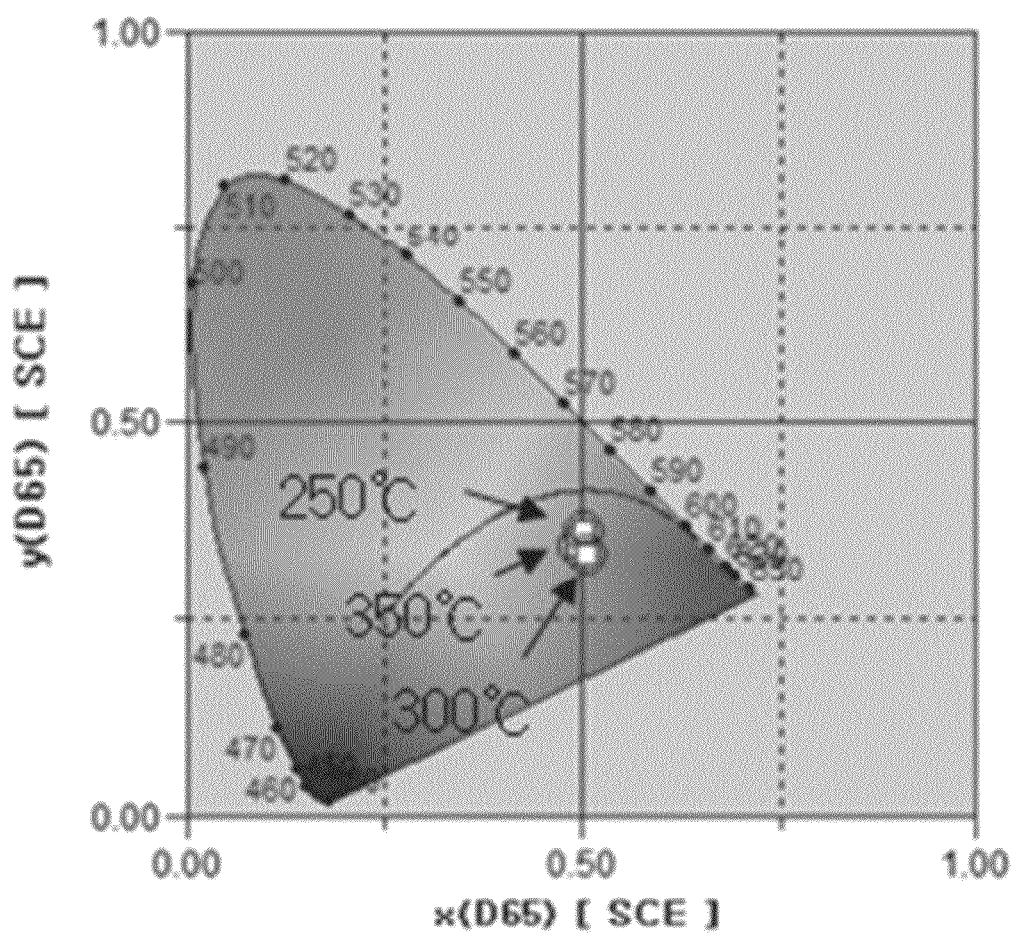
FIG. 8 is a color coordinate diagram showing color characteristics of electrochromic devices according to Examples 1 to 3.

FIG. 8 is a color coordinate diagram showing the color characteristics of the electrochromic devices obtained from Examples 1 to 3. In FIG. 8, x(D65)[SCE] and y(D65)[SCE] indicate color coordinates of specular component excluded (SCE) at color temperature of 6500K with National Television System Committee (NTSC).

As shown in FIG. 8, the electrochromic devices according to Examples 1 to 3 in which the titanium oxide ($TiO_2$) layer is heated at about 350° C., about 300° C., and about 250° C. have similar color coordinates.

From the results, it is understood that there is no affect on the color characteristics even when the titanium oxide ($TiO_2$) layer is heated at a relatively low temperature.

Evaluation 4

The color characteristics of the electrochromic devices obtained from Example 1 and Comparative Example 2 are compared as follows.

Figure 9:
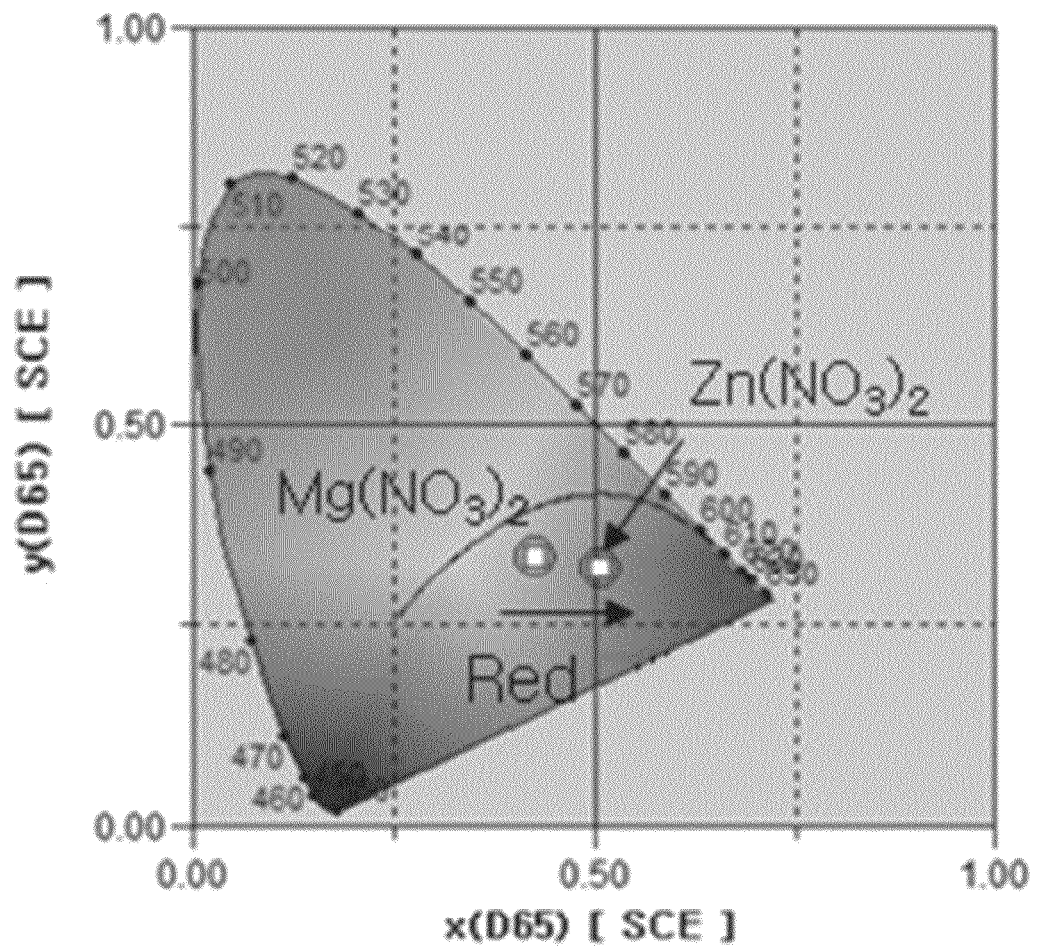
FIG. 9 is a color coordinate diagram comparing color characteristics of electrochromic devices according to Example 1 and Comparative Example 2.

FIG. 9 is a color coordinate diagram showing the color characteristics of the electrochromic devices obtained from Example 1 and Comparative Example 2. In FIG. 9, x(D65)[SCE] and y(D65)[SCE] indicate color coordinates of specular component excluded (SCE) at color temperature of 6500K with National Television System Committee (NTSC).

As shown in FIG. 9, the electrochromic device according to Example 1 has improved color coordinates compared to those of the electrochromic device obtained from Comparative Example 2.

Evaluation 5

The color gamut of electrochromic devices obtained from Examples 1, 4, and 5 are compared with the color gamut of electrochromic devices obtained from Comparative Examples 2 to 4 as follows.

Figure 10:
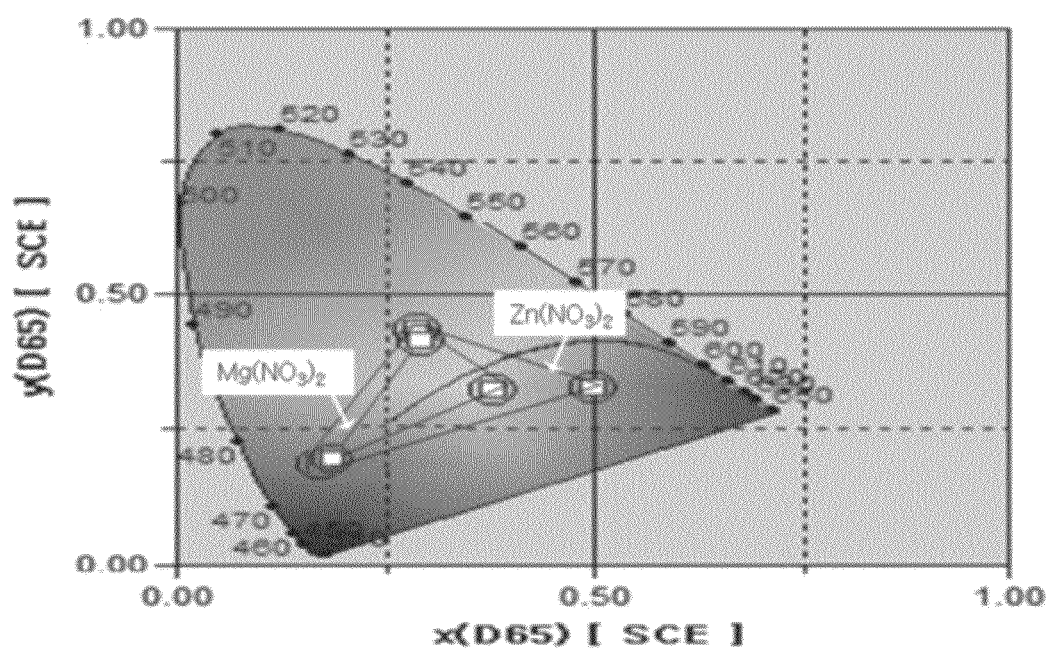
FIG. 10 is a color coordinate diagram showing and comparing the color gamut of electrochromic devices according to Examples 1, 4, and 5 and the color gamut of electrochromic devices according to Comparative Examples 2 to 4.

FIG. 10 is a color coordinate diagram showing the color gamut of electrochromic devices obtained from Examples 1, 4, and 5 and the color gamut of electrochromic devices obtained from Comparative Examples 2 to 4. In FIG. 10, x(D65)[SCE] and y(D65)[SCE] indicate color coordinates of specular component excluded (SCE) at color temperature of 6500K with National Television System Committee (NTSC).

Referring to FIG. 10, it is understood that the color gamut formed by connecting the color coordinates of the electrochromic devices obtained from Examples 1, 4, and 5 is wider than the color gamut formed by connecting the color coordinates of the electrochromic devices obtained from Comparative Examples 2 to 4. From the results, it is understood that the color range expressed by the electrochromic devices obtained from Examples 1, 4, and 5 is wider than the color range expressed by the electrochromic devices obtained from Comparative Examples 2 to 4.

Evaluation 6

The electrochemical stability of the electrochromic device obtained from Example 1 is confirmed as follows.

Figure 11:
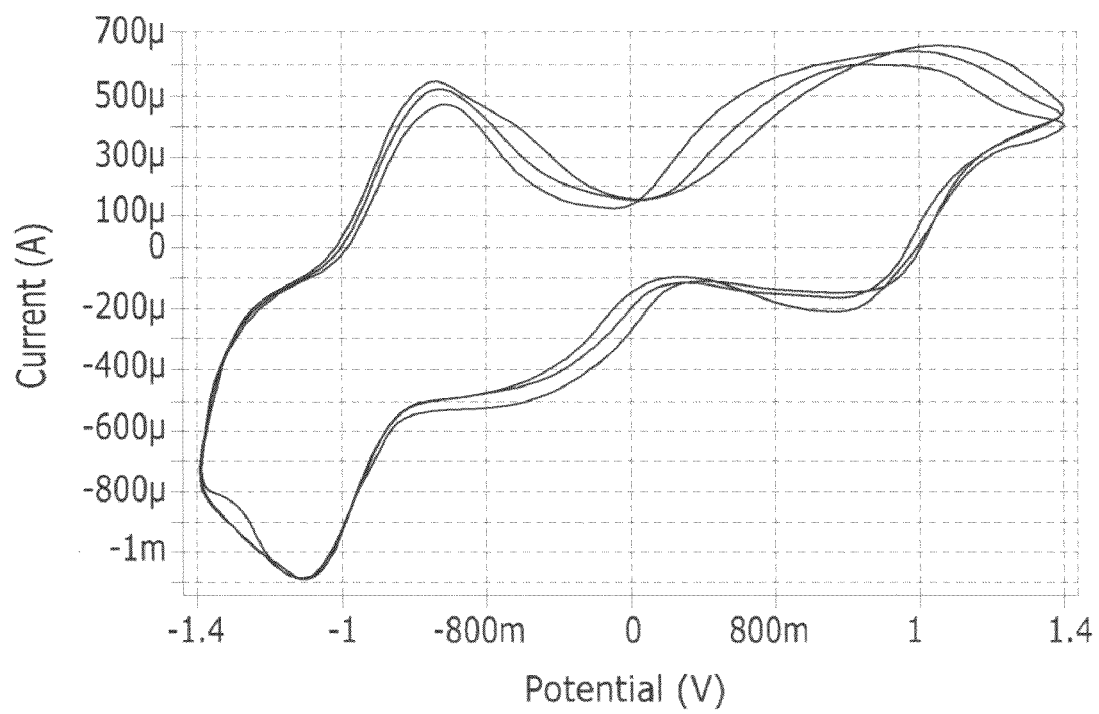
FIG. 11 is a graph showing cyclic voltametry characteristics of electrochromic device according to Example 1.

FIG. 11 is a graph showing the cyclic voltametry characteristics of the electrochromic device obtained from Example 1.

Referring to FIG. 11, it is understood that the electrochromic device obtained from Example 1 has almost a constant peak potential and current after cycling 50,000 times within a constant voltage range. From the results, it is confirmed that the electrochromic device obtained from Example 1 has electrochemical stability depending upon the oxidation and reduction states.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. An electrochromic device, comprising:
   a first electrode and a second electrode facing each other;
   an electrochromic layer between the first electrode and the second electrode; and
   an electrolyte between the first electrode and the second electrode, the electrolyte contacting the electrochromic layer,
   wherein
   the electrochromic layer includes a plurality of oxide semiconductor particles, a metal oxide on surfaces of the oxide semiconductor particles, and an electrochromic material, and
   energy bandgaps of the oxide semiconductor particles are in a range of about 3 eV to about 5 eV and an energy bandgap of the metal oxide is in a range of about 3 eV to about 5 eV, and a difference of conduction band energy levels of the oxide semiconductor particles and the metal oxide is about 0.5 eV or less.

2. The electrochromic device of claim 1, wherein the energy bandgaps of the oxide semiconductor particles is in a range of about 3 eV to about 4 eV and the energy bandgap of the metal oxide is in a range of about 3 eV to about 4 eV.

3. The electrochromic device of claim 1, wherein the metal oxide includes zinc oxide.

4. The electrochromic device of claim 1, wherein the oxide semiconductor particles include at least one of titanium oxide, zinc oxide, zirconium oxide, strontium oxide, niobium oxide, hafnium oxide, indium oxide, tin oxide, and a combination thereof.

5. The electrochromic device of claim 1, wherein the electrochromic material is on surfaces of the oxide semiconductor particles.

6. The electrochromic device of claim 1, further comprising:
   a plurality of partitions separating a space between the first electrode and the second electrode into a plurality of regions.

7. A method of manufacturing an electrochromic device, comprising:
   preparing a first electrode;
   preparing an electrophoresis solution including a metal salt having metal ions and oxide semiconductor particles;
   dipping the first electrode and a reference electrode into the electrophoresis solution and applying a voltage to bond the metal ions to the oxide semiconductor particles and provide the oxide semiconductor particles bonded with the metal ions to one surface of the first electrode;
   heating the oxide semiconductor particles having the metal ions to form a metal oxide on surfaces of the oxide semiconductor particles;
   forming an electrochromic material on the oxide semiconductor particles;
   preparing a second electrode facing the first electrode; and
   providing an electrolyte between the first electrode and the second electrode,
   wherein an energy bandgap of the oxide semiconductor particles is in a range of about 3 eV to about 5 eV and an energy bandgap of the metal oxide is in a range of about 3 eV to about 5 eV, and
   wherein a difference of conduction band energy levels of the oxide semiconductor particles and the metal oxide is about 0.5 eV or less.

8. The method of claim 7, wherein the energy bandgap of the oxide semiconductor particles is in a range of about 3 eV to about 4 eV and the energy bandgap of the metal oxide is in a range of about 3 eV to about 4 eV.

9. The method of claim 7, wherein the oxide semiconductor particles include at least one of titanium oxide, zinc oxide, zirconium oxide, strontium oxide, niobium oxide, hafnium oxide, indium oxide, tin oxide, and a combination thereof.

10. The method of claim 7, further comprising:
    pressing the oxide semiconductor particles, wherein pressing the semiconductor particles includes one of pressing the oxide semiconductor particles while simultaneously heating the oxide semiconductor particles, pressing the oxide semiconductor particles before heating the oxide semiconductor particles, and pressing the oxide semiconductor particles after heating the oxide semiconductor particles.

11. The method of claim 7, further comprising:
    providing a plurality of partitions that are separated from each other on one surface of the first electrode after preparing the first electrode.

12. The method of claim 7, wherein the metal salt includes a zinc salt, and the metal oxide includes zinc oxide.

13. The method of claim 12, wherein the zinc salt includes at least one of zinc acetate, zinc carbonyl, zinc carbonate, zinc nitrate, zinc sulfate, zinc phosphate, zinc chloride, hydrates thereof, and a combination thereof.

14. The method of claim 7, wherein the preparing an electrophoresis solution includes dispersing the oxide semiconductor particles in a solvent including the metal salt.

15. The method of claim 14, wherein the metal salt is soluble in the solvent and the oxide semiconductor particles are insoluble in the solvent.

16. The method of claim 7, wherein heating the oxide semiconductor particles includes heating the oxide semiconductor particles at a temperature of about 450° C. or less.

17. The method of claim 16, wherein heating the oxide semiconductor particles includes heating the oxide semiconductor particles at a temperature of about 200° C. to about 350° C.

* * * * *